Sept. 2, 1958  E. A. MARKS ET AL  2,850,590
SWITCHES
Filed May 24, 1957
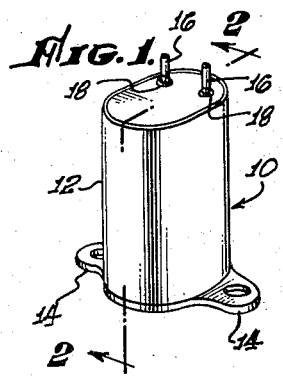
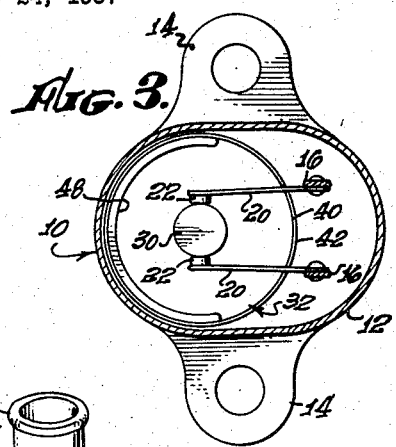
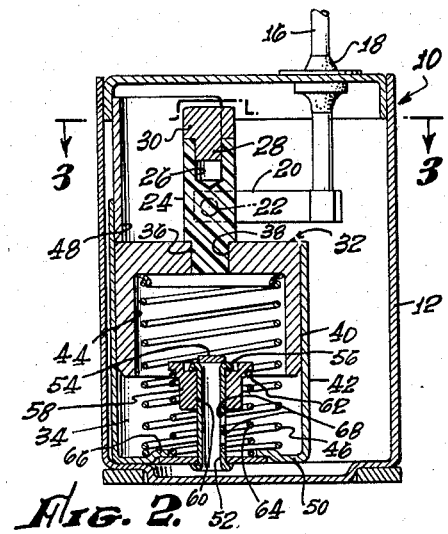
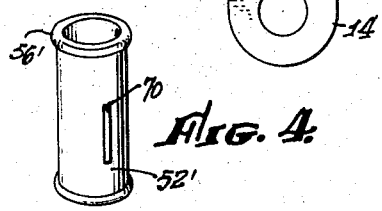
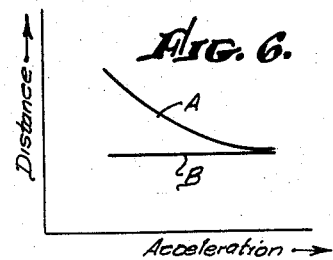
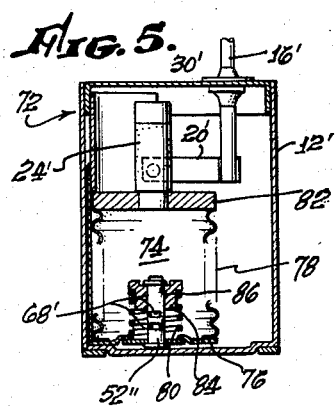
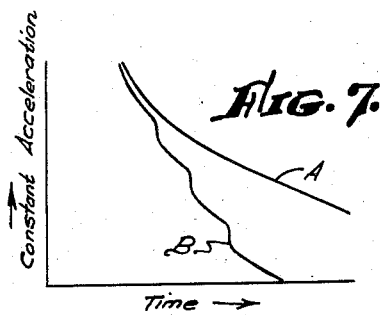
INVENTOR.

United States Patent Office 2,850,590
Patented Sept. 2, 1958

2,850,590
SWITCHES

Eugene A. Marks, Arlington, and Albert A. Ferguson, Riverside, Calif., assignors to Bourns Laboratories, Inc.

Application May 24, 1957, Serial No. 661,350

7 Claims. (Cl. 200—61.53)

This invention relates to new and improved acceleration responsive switches, and more particularly to switches which are designed so as to "make" or "break" a circuit after being propelled.

It is considered obvious that as missiles are launched from ground installations or from aircraft that these missiles are accelerated at various rates which are dependent upon a large number of factors such as the fuel used, the completeness of the fuel mixture, the operation of the firing mechanism, etc. For safety and other reasons it is usually advisable to actuate certain mechanisms within these missiles at certain predetermined distances from the launching or firing sites. For example, military missiles should preferably be "armed" or placed in a destructive condition at a predetermined distance from a launching site or aircraft. Differences in acceleration rates make it impractical to utilize conventional timing mechanisms such as various clockwork type devices in order to activate mechanism with any missile since the distance of a missile from a launching or firing site will vary in accordance with the acceleration of it.

A large number of efforts have been made to develop suitable devices for use in activating various mechanisms within missiles after such missiles have been launched. The use of radio communication for this purpose is considered unnecessarily complex and involved for the relatively simple operations required. Also radio communication is subject to a number of various known limitations and disadvantages. Acceleration sensitive clockwork mechanisms have also been proposed for this purpose. In general such devices are considered unacceptable since they are relatively complicated and tend to be somewhat unpredictable. Structures utilizing physical means attached to a missile and to a launching or firing site have also been considered for use in activating mechanisms within a missile, but such structures have a number of obvious limitations and disadvantages.

An object of this invention is to provide acceleration responsive switches for use in electrically activating mechanisms within missiles. A more specific object of this invention is to provide switches which are capable of being actuated when subjected to acceleration at predetermined distances which are independent of the rate of acceleration. A further object of the invention is to provide what may be termed "acceleration time delay switches" since such switches operate in accordance with acceleration and time when used for the purpose intended. Still further objects of the invention are to provide switches of the class indicated which are light in weight, small in size, extremely reliable, and relatively simple and inexpensive to manufacture.

Still further objects of the invention as well as many advantages of it will be fully apparent to those skilled in the art to which the invention itself pertains from a detailed consideration of the remainder of this description, including the appended claims and the accompanying drawing in which:

Fig. 1 is a perspective view of a switch of this invention;

Fig. 2 is a cross-sectional view taken at line 2—2 of Fig. 1;

Fig. 3 is a cross-sectional view taken at line 3—3 of Fig. 2;

Fig. 4 is a perspective view of a modified part capable of being used in switch illustrated in the preceding figures;

Fig. 5 is a view similar to Fig. 2 of a modified switch of this invention; and

Figs. 6 and 7 are graphs illustrating the operation of this invention.

In all figures of the drawing like numerals are used to designate like parts wherever convenient for purposes of illustration and explanation. It is to be understood that the accompanying drawing is not to be taken as limiting this invention in any respect. Those familiar with the field to which this invention pertains will realize that the principal features of this invention can be utilized in a wide variety of differently appearing instruments, each of which instruments may differ in appearance and internal structure from the instruments illustrated in the accompanying drawing.

As an aid to understanding the invention itself, it may be stated in essentially summary form that it involves acceleration responsive switches or acceleration time delay switches, each of which is formed so as to include a housing, within which a mass is supported by spring means so as to be movable in response to acceleration. A switch mechanism is provided in these devices so as to be capable of being actuated by the mass referred to in accordance with acceleration. Further, means are provided in these switches which are responsive to acceleration and which serve to control the rate of movement of the mass, and, hence, the actuation of the switch in accordance with time and with the acceleration to which the complete instrument is subjected. The term "mass" employed in this brief summary is intended to designate a relatively heavy member or body such as is commonly employed in an accelerometer or the equivalent device in order to move when subjected to acceleration.

The actual nature of the invention is best more fully explained by referring directly to the accompanying drawing. In Figs. 1, 2 and 3 in the drawing there is shown a switch or an acceleration time delay switch 10 of the present invention which includes a housing 12 to which there are attached conventional legs 14 for use in mounting this housing in a fixed position. Through the top of the housing there extend metal terminals 16 which are insulated from the housing proper by means of non-conductive ceramic members 18 of a known type of construction. Preferably the entire housing 12 is sealed, and the terminals 16 and non-conductive members 18 are fused in place in a known manner. Each of the terminals 16 carries within the housing 12 a resilient metal contact arm 20; attached as by welding or the equivalent to the ends of the contact arms 20 are small metal contact buttons 22. It will be realized that the contact arms 20 may be attached to the terminals 16 in any convenient manner such as, for example, by the use of welding or soldering techniques so that the contact buttons 22 are in electrical communication with the terminals 16.

When the switch 10 is in its normal position prior to use, these contact buttons 22 resiliently bear against the sides of a non-conductive support 24 as illustrated in Fig. 3 of the drawing. The top of this support 24 is provided with an internal recess 26 which is adapted to carry a correspondingly shaped end 28 upon a conductive metal member 30 having the same configuration as the support 24. If desired, the member 30 may be secured in place by an adhesive, threads or the equivalent. This construction is designed so that as a mass 32 is moved within a damping chamber 34 the support 24 and the member 30 will be moved so that the contact buttons 22 resiliently engage the member 30 in order to electrically connect the terminals 16. Thus, the support 24, the members 30 and the contact arms 20 and the attached buttons 22 constitute what may be termed a "switch" or "switch means."

Obviously other equivalent constructions may be used in place of the precise switch means shown and described. The type of switch means shown is considered more advantageous with this invention since it is extremely simple and is, in effect, foolproof in operation. If desired an almost identical type of switch construction can be employed so as to serve to break a circuit instead of making a circuit. With such a construction the support may be shortened so that the member 30 is normally engaged by the contact bottoms 22, and a non-conductive member (not shown) can be supported on the member 30 so as to be engaged by the buttons 22 after the mass 32 is moved. Obviously those skilled in the art to which this invention pertains will realize that a wide variety of various switch mechanisms which are designed to either "make" or "break" a circuit may be substituted for the precise switch means shown without departing from the principles of this invention.

The mass 32 is a comparatively heavy member which may be formed out of a wide variety of different materials such as heavy metal alloys of a type known to the art. The support 24 is attached to this mass 32 by means of a projection 36 on the support 24 fitting within a correspondingly shaped opening 38 in the center of this mass. Preferably the support 24 is sealed to the mass 32 at this point through the use of conventional adhesive threads or other equivalent means. The mass 32 is also formed so as to include a cylindrical exterior surface 40 which acts essentially as the exterior surface of a piston during the movement of the mass 32 within the damping chamber 34. It will be realized that this damping chamber 34 includes an external cup-like member 42 having internal dimensions which are substantially the same as the dimensions of the exterior surface 40. It will also be noted that the mass 32 has a generally cup-like interior configuration 44 which is designed in such a manner that a common coil spring 46 may be readily held against movement except movement by the mass 32 tending to compress this spring. It will be noted that an interior wall 48 formed as a part of the housing 12 prevents the spring 46 from moving the mass 32 outside of the cup-like member 42. Thus, this mass 32 is free to press the coil spring 46 when the switch 10 is subjected to acceleration.

The cup-like member 42 is attached to the housing 12 as by welding or the like in a rigid manner so that the bottom 50 of it is spaced from the housing 12 itself. This bottom 50 serves to carry a small tube 52 formed of metal or other equivalents having a sealed top 54. It will be noted that the bottom of this tube 52 extends through the bottom 50 and is in communication with the entire interior of the housing 12. A small shoulder 56 is provided on the tube 52 adjacent to the top 54 in order to serve to retain movement of a second mass 58 of smaller weight and dimension than the mass 32. This second mass includes an interior surface 60 which fits closely against the exterior of the tube 52 so as to be held in sliding engagement therewith. It also includes a projecting shoulder 62 which retains the end of a second coil spring 64. The other end of this coil spring 64 rests against the bottom 50 of the cup-like member 42 in the same manner in which the coil spring 46 is held. If desired, means constituting a ridge 66 may be formed integrally with the bottom 50 in order to hold the respective ends of these springs 46 and 64 in place. The second mass 58 is free to move in the same manner as the mass 32 as the entire switch 10 is accelerated.

As the second mass 58 moves, orifices 68 within the lower portion of the tube 52 are closed one after another, reducing the area through which gas may flow from the interior of the damping chamber 34 into the interior of the housing 12 itself. It will be noted that the orifices 68 employed in the embodiment of the invention shown are of the same dimension and are equally spaced from one another. These orifices may be graduated in size or may be spaced unequal distances from one another so as to provide a variable damping effect. If desired, more orifices than are shown can be employed. If desired, the same general type of damping effect achieved with the orifices 68 may be obtained in part through the use of an elongated slit 70 in a modified tube 52' as illustrated in Fig. 4 of the drawing. In order to provide special damping effects this slit may be formed so as to have a varying width throughout its length.

It also is possible to obtain the action of the switch 10 with a modified switch 72 as illustrated in Fig. 5 of the drawing. This modified switch 72 utilizes many of the same parts of the switch 10. For convenience certain of those parts of the modified switch which are identical to the equivalent parts of the switch 10 are merely designated by the primes (or double primes) of the numerals previously used and are not specifically spelled out in the specification.

In the modified switch 72 the damping chamber 34 is replaced by another damping chamber 74, and this damping chamber 74 is constituted by a bottom 76 which is rigidly secured to a housing 12' so as to be spaced therefrom. This bottom 76 carries a bellows 78, such as may be formed out of brass or other equivalent metals or the like; the bellows are attached to the bottom 76. The top of the bellows 78 are sealed to a first mass 82 similar to the mass 32. The first mass 82 carries a support 24' substantially as previously described. A second mass 84 is provided with an internal surface 86 which slides against the external surface of a tube 52'' of the category previously described. If desired, this tube 52'' may be provided with a slot as indicated in Fig. 4 instead of with various orifices 68' as shown. A spring 80 similar to the spring 64 previously described supports the second mass 84 so as to permit movement of acceleration.

During the operation of the modified switch 72 the first and second masses 82 and 84 move substantially in the manner indicated in discussing the switch 10. Those skilled in the art to which this invention pertains will realize that the bellows 78 in this modified construction not only serve so as to define the dimensions of this damping chamber 74, but also serves the same function as the springs 46 previously described.

The method in which the switches of the present invention operate when subjected to acceleration so as to actuate the switch means employed after a predetermined distance is best explained more fully with reference to Figs. 6 and 7 of the drawing. Since the distance of a switch on a missile or the like from a launching site or the equivalent, will vary depending on the time the switch has been subjected to acceleration, it is preferred that the constructions of the present invention incorporate orifice means such as the orifices 68 or the slot 70 in order to provide a variable damping effect which will serve to retard movement of the first mass means employed in the constructions shown in order to accomplish the actuation of the switch means employed at a given distance from a launching site. If the motion of these first mass means was only opposed by the action of the spring means illustrated and by the use of a conventional type of damping orifice of fixed dimensions, a damping curve A substantially as indicated in Fig. 6 of the drawing would be obtained when distance from a launching site for a missile after a given time interval is plotted against acceleration as shown. When, however, variable orifice means as herein described are employed a comparatively straight curve such as the curve B in Fig. 6 can be obtained when distance from a launching site after any given time interval such as is normally encountered in a missile or the equivalent is plotted against acceleration. Obviously the shape of the curve B in this figure can be varied from the precise shape shown in accordance with the shape, dimensions and configuration of the orifice means employed.

When an acceleration responsive switch is used in tests comparing the time required for the switch to be actuated at a given distance from a launching site for a missile against acceleration as indicated in Fig. 7 of the drawing, a switch using a fixed dimension orifice for damping as indicated will give a curve such as a curve A shown in this figure, whereas a curve such as the curve B will be obtained when a series of orifices as herein described is used. It will be realized that the curve B in Fig. 7 is of a discontinuous nature and that the sections of this curve correspond to various periods at which different ones of the orifices employed are "closed" by movement of the second mass means indicated. A continuous curve having substantially the shape of the curve B in Fig. 7 can be obtained utilizing slits such as the slits 70 as shown in Fig. 4. The shape of the curve B in Fig. 7 will, of course, vary in accordance with the size and shape of the various damping means employed.

It is to be emphasized that the various means constituting an orifice employed with this invention, whether such means are a series of separate orifices or openings or are a tapered slit or the equivalent, are covered or closed in this operation of constructions of this invention in accordance with acceleration. It will be realized that the time of actuation of these switches is mathematically related to the magnitude of acceleration. With the constructions of this invention a variable damping effect is obtained so as to accomplish switch actuation at a given distance which is normally independent of rate of acceleration and of any specific time interval.

Obviously the switches herein described may be modified in a number of different ways so as to accomplish the effective results of this invention. For example, the various orifices and the slits indicated in this specification may be replaced with porous tubes which gradually become covered during operation of these switches. Also instruments may be created in which pressure built up within a damping chamber serves to actuate means varying the effective or open size of various orifice means such as are herein described.

The type of mechanism described herein can obviously be modified so that the secondary mass means employed can be used to open orifice means as indicated as well as to close such orifice means. By appropriate design variation of an engineering category the switches of this invention can be manufactured so as to be actuated in accordance with the variables time, distance, velocity and acceleration in a wide variety of different relationships or manners. Such relationship can be expressed by a wide variety of mathematical formula.

Those skilled in the art to which this invention pertains will realize that the constructions described herein are extremely simple, compact and yet are extremely efficient and reliable for the purpose intended. They will further realize that a number of different modifications may be made in these constructions without departing from the essential principles or features of this invention. As an example of this the tube 52 may be mounted within a housing so as to extend from instead of into the principal portion of a damping chamber, and the secondary mass means employed may be mounted so as to cover portions of the orifice means herein described during the motion of the secondary mass means. Because of these factors this invention is to be considered as being limited only by the appended claims forming a part of this disclosure.

We claim:

1. An acceleration responsive switch comprising a housing, a cylinder mounted within said housing to form the side walls of a damping chamber, a mass member piston slidably disposed within said cylinder, a spring engaging said piston and yieldingly holding the same at one end of said cylinder, the other end of said cylinder being closed, means constituting a damping orifice leading from said damping chamber, acceleration responsive means for controlling the effective size of said damping orifice and thereby controlling the rate of movement of said piston, and switch means operatively connected to said piston so as to be actuated by movement of the piston.

2. An acceleration responsive switch comprising a housing, means defining a damping chamber within said housing, a mass member movably mounted so as to constitute a wall of said damping chamber, said mass member being movable in response to acceleration, wall means forming a part of said damping chamber, a plurality of spaced orifices of graduated sizes extending through said wall means, a second mass member movably mounted so as to fit against said wall means, said second mass member being movable with respect to said orifices to vary the total effective area thereof and thereby vary the rate of movement of said first-named mass member.

3. An acceleration responsive switch which comprises: a housing; means defining a damping chamber within said housing, said damping chamber having an internal surface of uniform cross-sectional configuration; first mass means positioned within said chamber so as to be movable therein, said first mass means having an external surface fitting closely against the said internal surface of said damping chamber; first spring means serving to oppose movement of said first mass means; a tube-like member attached to said damping chamber, said tube-like member having a surface of uniform cross-sectional configuration; second mass means having a surface fitting closely against said surface of said tube-like member, said second mass means being movable; second spring means serving to oppose movement of said second mass means; orifice means extending through said surface of said tube-like member, said orifice means being adapted to be closed by movement of said second mass means; and switch means connected to said first mass means so as to be actuated by movement of said first mass means.

4. An acceleration responsive switch as defined in claim 3 wherein said switch means include: non-conductive means mounted on said first mass means; conductive means held upon said non-conductive means; and resilient contact means mounted within said housing so as to normally resiliently engage said non-conductive means, said first mass means being capable of motion in response to acceleration so as to cause said conductive means to be engaged by said contact means.

5. An acceleration responsive switch as defined in claim 3 wherein said orifice means comprises a series of apertures of different dimensions.

6. An acceleration responsive switch which includes: a housing; first and second mass means mounted within said housing; means defining a damping chamber around said first and second mass means within said housing; first and second spring means serving to engage said first and second mass means so as to oppose motion thereof; switch means connected to said first mass means so as to be actuated by movement of said first mass means; stationary means having orifice means formed therein mounted within said housing so that said orifice means are normally covered by said second mass means, said second mass means being movable so as to vary the effective size of said orifice means in communication with the interior of said damping chamber.

7. An acceleration responsive switch comprising a housing, means defining a damping chamber within said housing, a mass member mounted so as to constitute a movable wall of said damping chamber, said mass member being yieldingly urged in one direction and being movable in the other direction responsive to acceleration, means constituting a damping orifice leading from said damping chamber, acceleration responsive means for controlling the effective size of said damping orifice and thereby controlling the rate of movement of said mass member, and switch means comprising a pair of spaced contacts positioned adjacent said mass member, and a conductive member carried by said mass member and movable therewith to a position bridging said spaced contacts.

References Cited in the file of this patent

UNITED STATES PATENTS

| | | |
|---|---|---|
| 2,424,390 | Ferris | July 22, 1947 |
| 2,713,097 | Wooten | July 12, 1955 |